Figure 13:
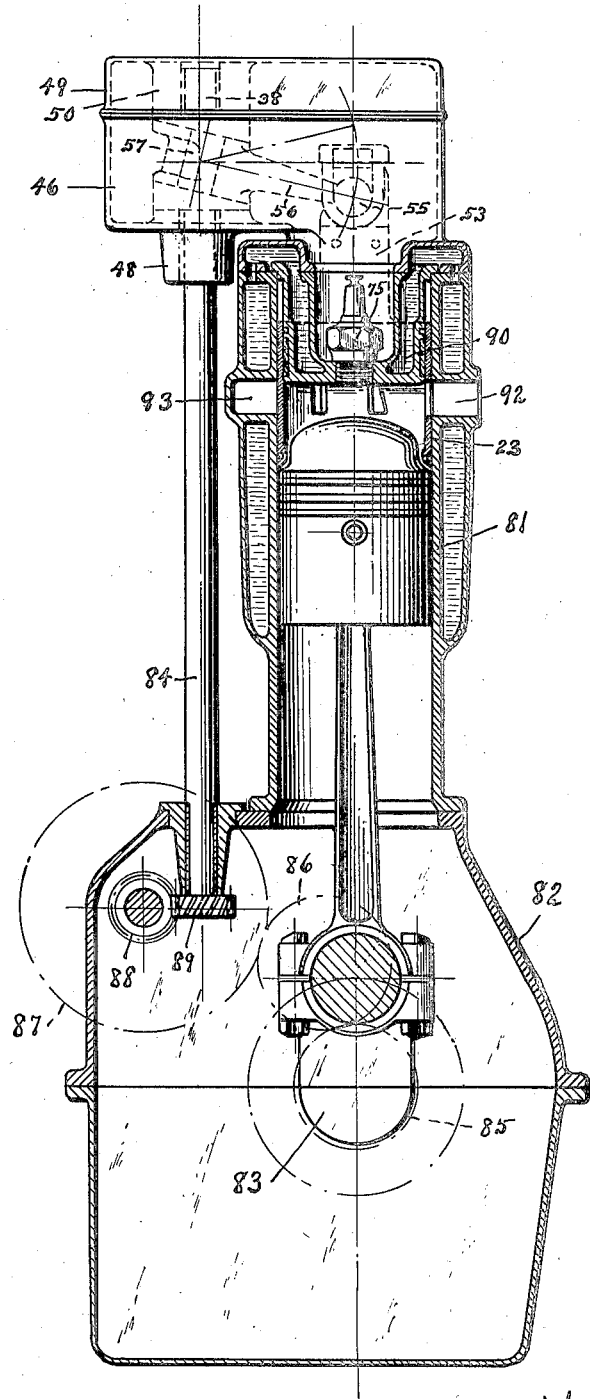

June 22, 1926.  
K. W. NAJDER  
1,589,983  
SINGLE SLEEVE VALVE FOR INTERNAL COMBUSTION ENGINES  
Filed Sept. 18, 1922 5 Sheets-Sheet 1
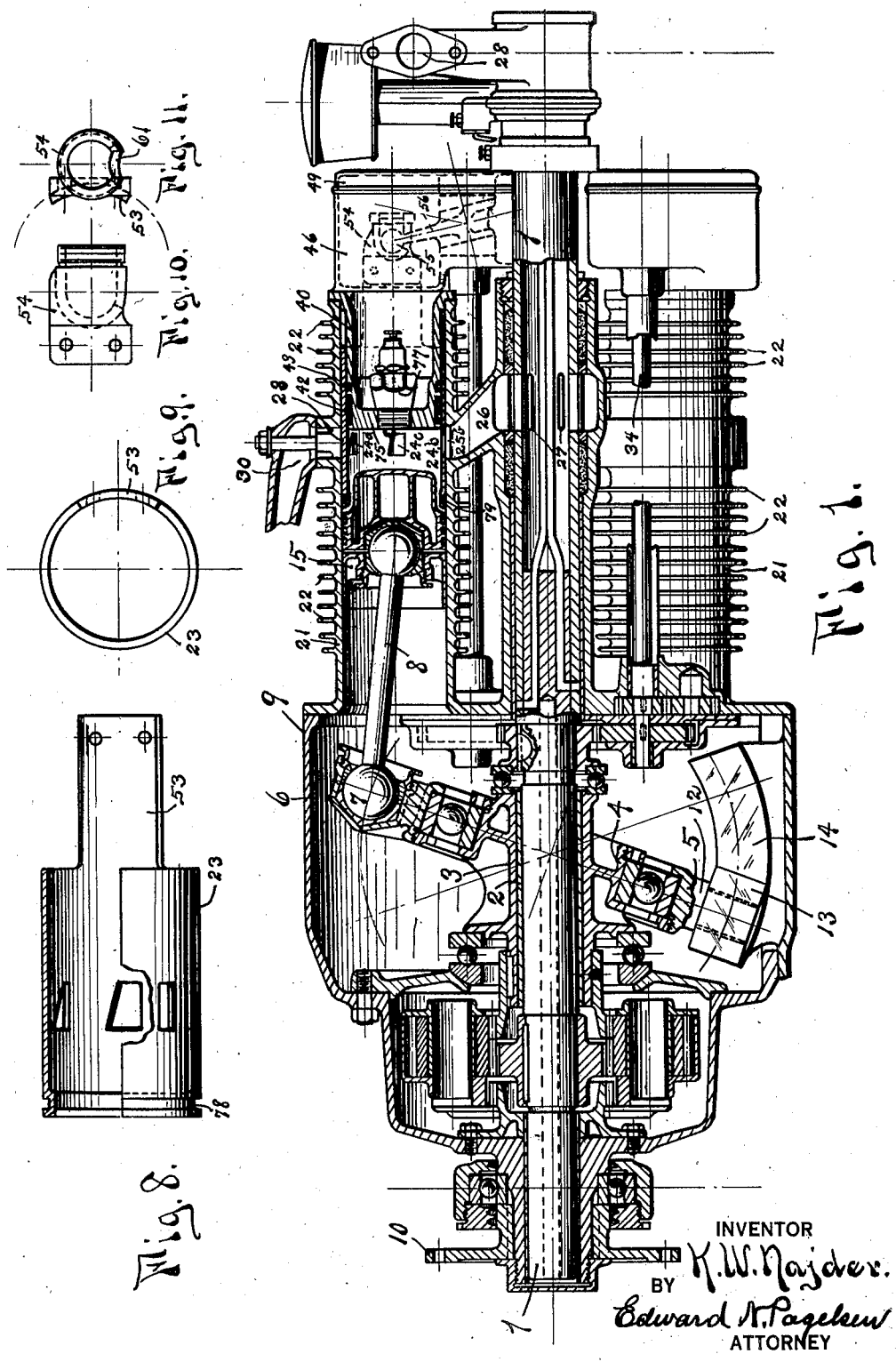
INVENTOR  
K.W. Najder.  
BY  
Edward N. Pagelsen  
ATTORNEY

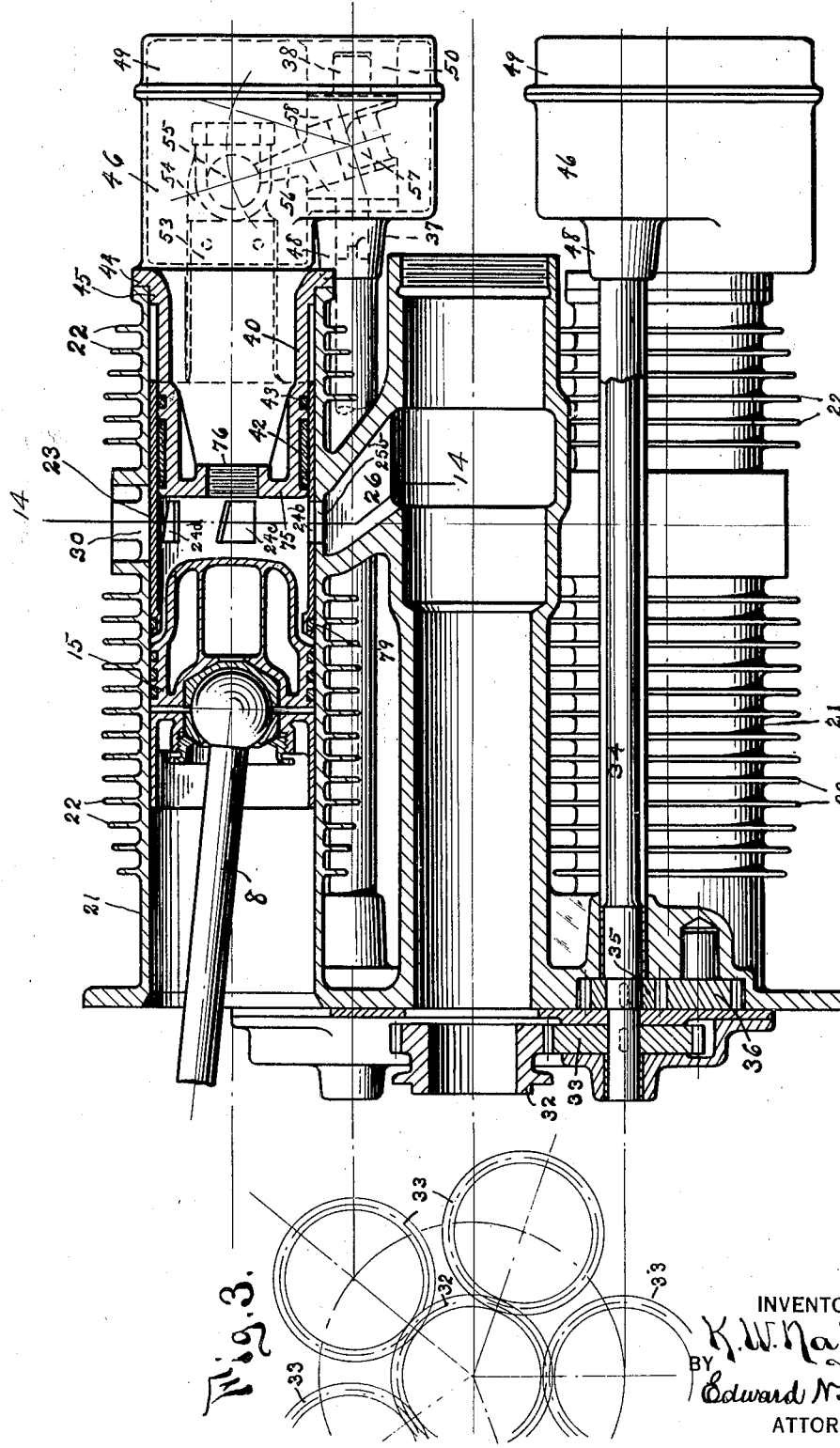

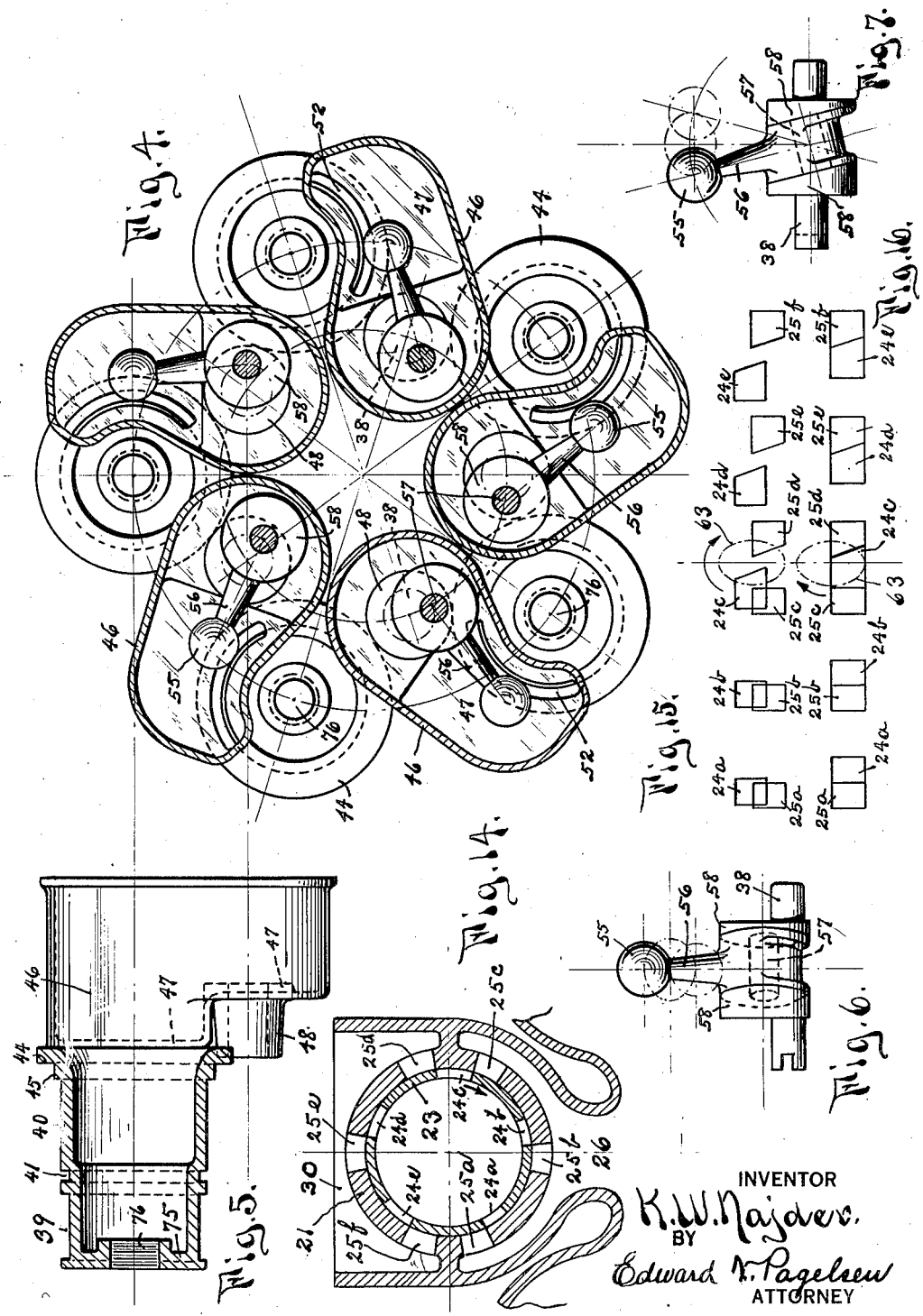

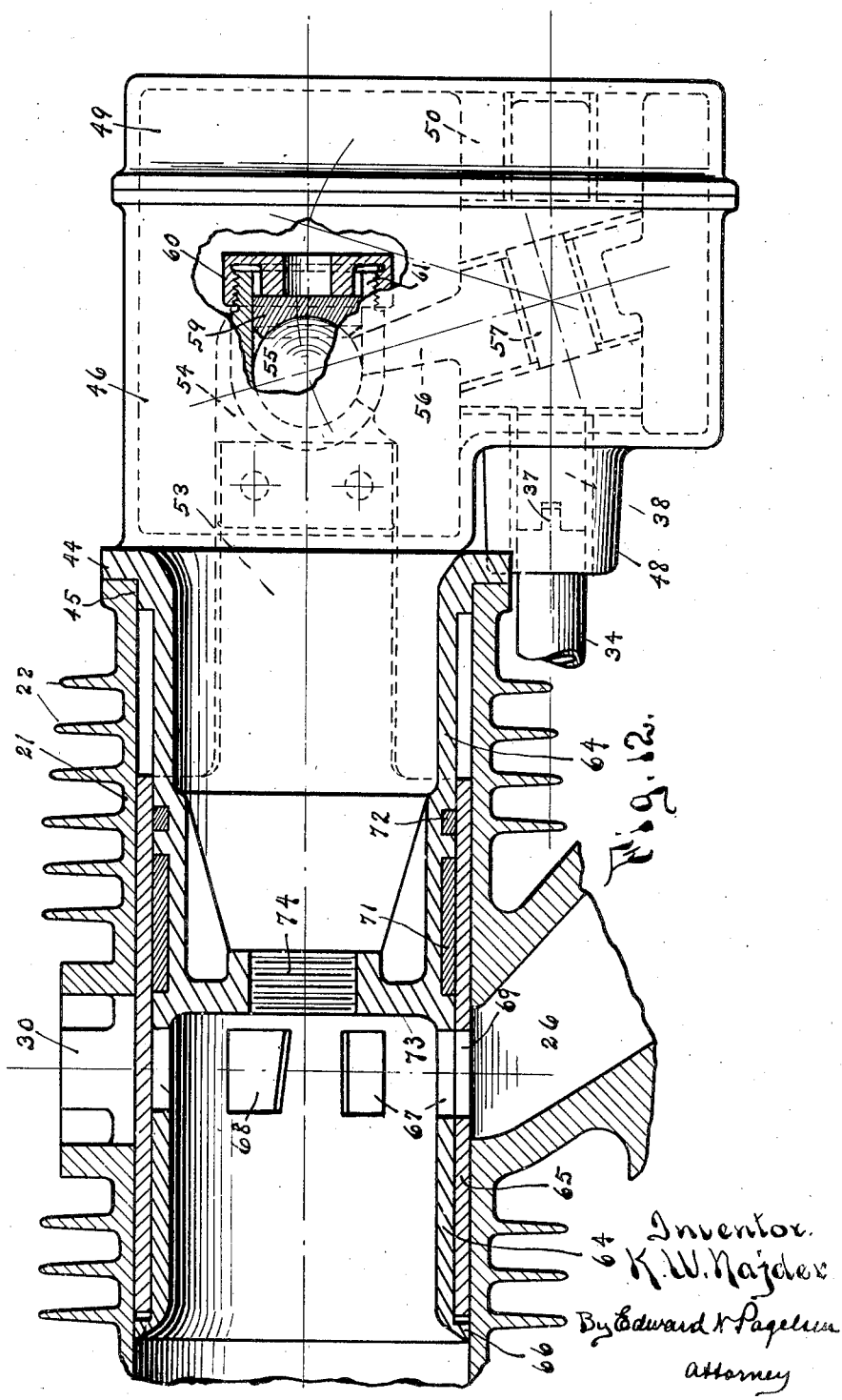

Patented June 22, 1926.

1,589,983

UNITED STATES PATENT OFFICE.

KASIMIR W. NAJDER, OF DETROIT, MICHIGAN, ASSIGNOR OF FIFTEEN ONE-HUNDREDTHS TO ISAAC S. GELLERT, OF DETROIT, MICHIGAN.

SINGLE-SLEEVE VALVE FOR INTERNAL-COMBUSTION ENGINES.

Application filed September 18, 1922. Serial No. 588,875.

This invention relates to valve constructions for controlling the admission of fuel to the explosion chambers of internal combustion engines and for controlling the escape of the burnt gases, and its object is to provide a sleeve valve which will have a combined longitudinal and rotary movement for the opening and closing of the engine inlet and exhaust ports, which valve shall constitute a wall of the explosion chamber and shall always be independent of and out of contact with the piston within the working cylinder, and which valve can be properly packed on its inner and outer sides so as to prevent leakage, which can be operated from a point at the top of the cylinder where it is readily accessible and can be entirely enclosed to prevent leakage of lubricants.

This invention consists, in combination with a working cylinder and a piston therein, of a sleeve valve slidable in said cylinder and having dimensions which do not depend upon the diameter of the piston, the sleeve valve and the cylinder being provided with inlet and exhaust ports adapted to register at proper times, and means for imparting a combined longitudinal and rotary movement to said sleeve valve.

It further consists in a cylinder head extending into the sleeve valve, packing for preventing leakage between the head and the sleeve valve and between the sleeve valve and the cylinder, and an extension on the sleeve valve passing through an opening in the head in order to permit a connection between the operating mechanism for the sleeve and said sleeve entirely outside of the cylinder and its head.

It further consists in a shaft extending along the cylinder and means for rotating the shaft, a crank pin carried by said shaft inclined to the axis of the shaft, and a connecting rod mounted on said crank pin and connecting to the extension on the sleeve valve for the purpose of giving a rotary and longitudinal movement to said valve.

It further consists in the details of construction illustrated in the accompanying drawings and particularly pointed out in the claims.

In the drawings, Fig. 1 is a longitudinal section of an engine embodying this improved valve mechanism. Fig. 2 is a longitudinal section of a working cylinder of an engine embodying this valve mechanism, which engine is provided with an odd number of working cylinders. Fig. 3 is a diagrammatic view illustrating the driving gears for the valve mechanism. Fig. 4 is a transverse section through the chamber containing the valve cranks. Fig. 5 is a detail of a cylinder head. Figs. 6 and 7 are elevations of a valve operating connecting rod and a portion of the driving mechanism on which it is mounted, the connecting rod being shown in two positions. Fig. 8 is an elevation of the valve, a part being broken away for clearness. Fig. 9 is an end elevation of the valve taken from the right in Fig. 8. Figs. 10 and 11 are elevations of the bearing or socket for the ball on the end of the connecting rod that operates the valve. Fig. 12 is a section of a cylinder and an elevation of a portion of a cylinder head of a modified type of engine embodying the present invention. Fig. 13 is a longitudinal section of a stationary-cylinder engine embodying this invention. Fig. 14 is a section on the line 14—14 of Fig. 2. Figs. 15 and 16 are developments of the ports in the cylinder and valve sleeve.

Similar reference characters refer to like parts throughout the several views.

The invention shown in the drawings is a modification of that shown in the patent to Charles L. Nedoma No. 1,492,215, to which reference is made, and the present invention does not include the details of the driving mechanism, the stationary shaft or the cylinders and housings shown in said application, but is limited to the construction of a novel single sleeve valve for internal combustion engines and the operating mechanism therefor. The engine shown in the Nedoma patent has been selected because of its complicated construction and because a valve mechanism which is adapted to operate in connection with that engine can easily be applied by those skilled in the art to internal combustion engines of practically every other construction.

The embodiment shown in Fig. 13 illustrates the simplicity of the mechanism for ordinary internal combustion engines of the stationary type.

As indicated in the Nedoma patent above referred to, the stationary shaft 1 carries the sleeve 2 on which a spool 3 is rotatable and this spool embodies an inclined bearing support 4 around which a ring 5 is rotatable.

This ring 5 carries sockets 6 to receive the balls 7 at the ends of the connecting rods 8 and the interaction of the several parts causes a rotation of the housing 9 about the shaft 1. At the end of the case is secured a flange 10 to which may be attached any desired type of belt, pulley, gear, clutch or other mechanism for transmitting the power of the engine.

The rotary movement of the ring 5 is transmitted to the case 9 by means of an arm 12 which carries a block 13 that slides within an arcuate guide 14 attached to the housing 9. As explained in the Nedoma patent, the spool 4 rotates in one direction and the ring 5 in the opposite direction, whereby a complete stroke of each piston 15 is obtained for each 90 degrees of rotation of the housing. As this engine is of the four cycle type, an explosion is had in each cylinder for each rotation of the housing. The mechanism thus far indicated has nothing to do with the present invention as it is all fully described in the application referred to.

The cylinder 21 is shown provided with heat radiating fins 22, although any other method of cooling the cylinder may be employed. As the piston 15 contacts directly with the wall of the cylinder 21, the cooling of this piston may be amply provided for by the fins 22. While the cylinder is shown in Figs. 1 and 2 to have a continuous bore of constant diameter, this invention is not limited to cylinders of this character as it is merely a manufacturing advantage to provide cylinders of constant diameter, the single sleeve valve of my invention being equally operable when its diameter differs from that of the piston.

The valve 23 (Fig. 8) is tubular and is provided with intake ports 24$^a$, 24$^b$ and 24$^c$ and exhaust ports 24$^c$, 24$^d$ and 24$^e$, the port 24$^c$ being common to both intake and exhaust, which are preferably one more or less in number than the ports 25$^a$ to 25$^f$ inclusive of the cylinder. The ports 24$^a$, 24$^b$ and 24$^c$ in the valve permit a connection between the combustion chamber in the cylinder and the fuel conduit 26 in the housing, which connects by means of the ports 27 in the hollow portion of the shaft 1 to a carbureter connected to the passage 28 shown in Fig. 1. The ports 24$^c$, 24$^d$ and 24$^e$ in the valve connect this explosion chamber to the exhaust passage 30. When the ports 24 are in the position shown in Figs. 1 and 2, fuel may pass from the interior of the shaft to the cylinder, but when the sleeve is turned one half the distance between adjacent ports, then the ports 24$^a$ communicate with the exhaust port 30. This will be referred to later on.

Secured to the stationary shaft 1 is a gear 32 which meshes with gears 33 attached to the shafts 34, one of which is provided to operate each valve. A gear pump for lubricant consisting of a pinion 35 on a shaft 34 and a gear 36 meshing therewith are shown in Figs. 1 and 2, but this forms no part of the present invention. As the gears 32 and 33 are equal in diameter, and the shaft 34 is carried around the shaft 1 by the housing, this shaft will make one rotation for each rotation of the housing and for each four strokes of the piston 15. The outer end of this shaft is connected by an end spline 37, shown in dotted lines in Fig. 2, to the short crank shaft 38, clearly shown in Figs. 4, 6 and 7. This short crank shaft is mounted in a pocket in the cylinder head of the engine.

The cylinder head comprises a tubular extension 40 shown in Fig. 5 having grooves 39 and 41 to receive the packing rings 42 and 43 which prevent leakage between this extension and the sleeve valve 23. The cylinder head has a circumferential shoulder 44 to fit against the end of the cylinder and a cylindrical guide portion 45 to center the head relative to the cylinder and the valve sleeve therein. At this shoulder the head has an offset extension in the form of a pocket whose wall 46 is shown in section in Fig. 4 and in elevation in Fig. 5. At the bottom 47 of this pocket and integral therewith is a boss 48 which constitutes a bearing for the outer end of the shaft 34 and the inner end of the short crank shaft 38. This pocket has a cover 49, shown in Fig. 2, which has a boss 50 on its inner side that constitutes a bearing for the outer end of the crank shaft 38. The bottom 47 of the pocket in the head has an arcuate slot 52 to permit the free movement, both longitudinal and rotary, of the extension 53 on the sleeve 23. It will be seen in Fig. 2 that the packing rings on the extension 40 of the cylinder head engage the entire portion of the sleeve and never contact with this extension. This avoids all danger of leakage between the sleeve valve and the cylinder head.

Attached to the outer side of the outer end of this extension 53 of the sleeve valve is a socket member 54, shown in Figs. 10 and 11, which receives the ball 55 on the outer end of the connecting rod 56 whose inner end is mounted on the crank pin 57 which extends between the inclined crank disks 58 on the crank shaft 38. One stroke of this crank pin is shown in Figs. 4 and 6 and this stroke determines the rotary movement of the sleeve valve. The other stroke is shown in Figs. 2 and 7 and determines the longitudinal movement of this sleeve valve. The combination of this rotary movement with this longitudinal movement results in what may be termed a skew movement of the sleeve.

The ball 55 is held in position in the socket 54 in any desired manner, but I prefer the construction shown in Fig. 12, which is as follows.

A removable bearing member 59 fits in this socket on the ball 55 and is held in position by the adjustable cap 60. The socket is provided with a notch 61 to receive the connecting rod 56.

This mechanism is so proportioned that the shaft 34 makes one rotation for each complete operation of the engine consisting of intake, compression, explosion and scavenging strokes. The sleeve valve has back and forth rotary movements and in and out longitudinal movements to open and close the inlet and outlet ports of the cylinder during such period. The resultant of these sets of movements is that each point on the valve travels an elliptical path whose two axes may be varied as desired, and may even be equal so that the path is circular. The sequence of operation of the valve is that it moves inwardly to open the exhaust ports of the cylinder, then turns to close these exhaust ports and open the inlet ports, then moves outwardly to close the inlet ports and while the piston is moving through its compression and explosion strokes and while all the ports are closed, the valve completes its longitudinal outward movement and then returns while rotating to bring its exhaust ports into position to aline with the exhaust ports of the cylinder at the end of the working stroke of the piston. In practice, the valve is at the outer end of its longitudinal movement at about the instant of the explosion and at this position, the ports in the valve are covered by the wide packing ring 42 of the cylinder head.

The ports in the cylinder and valve are shown in cross section in Fig. 14 and diagrammatically in Figs. 15 and 16. Fig. 16 shows the ports in the same relative positions as does Fig. 14, that is just after the end of the exhaust or scavenging stroke and just before the beginning of the charging stroke. Fig. 15 shows these ports just before the end of the inlet positions. The elliptical path of the valve is indicated by the dotted lines 63 of Figs. 15 and 16. This elliptical path 63 is preferably considerably longer vertically than the inlet parts 25 of the cylinder which gives sufficient time for the compression and explosion strokes during which the ports are entirely out of registration. At the instant of the explosion the packing ring 42 entirely covers the ports in the valve.

The port 24 C in the valve serves as both inlet and exhaust port, alternately, as it first registers with the exhaust port 25$^d$ of the cylinder and then with the inlet port 25 C.

In Fig. 12 is shown the same cylinder 21 with its fins 22 but the tubular portion of the cylinder head is of different construction from that above described. The tubular portion 64 is of sufficient length to extend beyond the inner end of the sleeve valve 65 and has an external circumferential shoulder 66 which tightly fits the cylinder and serves as a seal. The tubular portion 64 is provided with inlet ports 67 and exhaust ports 68 while the ports 69 of the sleeve valve 65 correspond thereto in the manner shown in Figs. 15 and 16. The portion 64 is again provided with packing rings 71 and 72. The operating mechanism for the valve and the details of the other parts may be the same as those above described and have the same reference characters in the drawing. The inner end of this tubular portion 64 constitutes the explosion chamber of the engine, the diaphragm 73 being formed with a threaded opening 74 to receive the spark plug. In the other construction, the walls 75 at the inner ends of the tubular portions 40 are provided with threaded openings 76 for the plugs 77.

As the circumferential shoulder 66 at the inner end of this tubular extension 64 prevents the passage of the burnt gases between it and the cylinder wall, no packing rings are necessary between this end of the valve and the cylinder wall. In Fig. 8 a groove 78 is shown in the sleeve valve 23 to receive a packing ring 79 to prevent such leakage.

Fig. 13 is a section of a stationary engine which embodies this valve mechanism. The cylinder 81 rests on a crank case 82. The crank shaft 83 drives the vertical shaft 84 one half rotation for each rotation of the crank shaft by means of gears 85 to 89 inclusive, several of the gears being merely indicated. The cylinder 81 and the tubular extension 90 of the cylinder head are shown water cooled.

The cylinder has an intake passage 92 and an exhaust passage 93 which connect to ports which may be duplicates of the ports 25$^A$ to 25$^t$ inclusive shown in Figs. 15 and 16 and the valve 23 may again have ports 24$^a$ to 24$^d$ inclusive. The operation of this valve and the mechanism for actuating it are the same as that shown in Figs. 1 and 2 and the same reference characters are employed.

The details of construction and the proportions of the parts of this valve mechanism may all be changed by those skilled in the art without departing from the spirit of my invention as set forth in the following claims.

I claim:—

1. In an internal combustion engine, the combination of a cylinder, a piston slidable therein, a sleeve valve slidable in the cylinder and out of contact with the piston at all times, a head closing the outer end of the cylinder and having a tubular portion extending into the valve, said head having a slot and said sleeve valve having an extension projecting through the slot, said valve and cylinder having exhaust and inlet ports adapted to register as the piston makes its scavenging and charging strokes respectively, and means connecting to said extension on the valve to impart rotary and longitudinal movements thereto.

2. In an internal combustion engine, the combination of a cylinder, a piston slidable therein, a sleeve valve slidable in the cylinder and out of contact with the piston at all times, a head closing the outer end of the cylinder and having a tubular portion extending into the valve, said head having a slot and said sleeve valve having an extension projecting through the slot, said valve and cylinder having exhaust and inlet ports adapted to register as the piston makes its scavenging and charging strokes respectively, and means connecting to said extension on the valve to impart rotary and longitudinal movements thereto embodying a rotating crank shaft, a crank pin thereon with its axis at an angle to the shaft and a connecting rod mounted on the crank pin and having its free end connected to the extension on the valve.

3. In an internal combustion engine, the combination of a cylinder, a piston slidable therein, a sleeve valve slidable in the cylinder and out of contact with the piston at all times, a head closing the outer end of the cylinder and having a tubular portion extending into the valve, said head having a slot and said sleeve valve having an extension projecting through the slot, said valve and cylinder having exhaust and inlet ports adapted to register as the piston makes its scavenging and charging strokes respectively, means connecting to said extension on the valve to impart rotary and longitudinal movements thereto, and piston rings between the inner end of the valve and the cylinder wall and between the extension of the cylinder head and the valve to prevent leakage longitudinally of the valve.

4. In an internal combustion engine, the combination of a cylinder, a piston slidable therein and in direct contact therewith, a sleeve valve slidable in the cylinder, a head closing the outer end of the cylinder and having a tubular portion extending into the valve, said head having an opening and said valve having a longitudinal extension projecting through said opening, said valve and cylinder each having inlet and exhaust ports adapted to register alternately with the inlet and exhaust ports of the other, and means to cause each portion of the valve to travel substantially an elliptical path.

5. In an internal combustion engine, the combination of a cylinder, a piston slidable therein and in direct contact therewith, a sleeve valve slidable in the cylinder, a head closing the outer end of the cylinder and having a tubular portion extending into the valve, said head having an opening and said valve having a longitudinal extension projecting through said opening, said valve and cylinder each having inlet and exhaust ports adapted to register alternately with the inlet and exhaust ports of the other, means to cause each portion of the valve to travel substantially an elliptical path, and a shell integral with the head enclosing the outer end of the extension of the valve and the actuating mechanism therefor.

6. In an internal combustion engine, the combination of a cylinder and a sleeve valve slidable and rotatable therein, said cylinder and valve having inlet and exhaust ports adapted to register alternately, a head for the cylinder having a tubular extension within the valve and means to prevent leakage between them, said head having an opening and said valve having an extension projecting through said opening and freely movable therein, and means on the outside of the head to impart movement to the valve.

7. In an internal combustion engine, the combination of a cylinder and a sleeve valve slidable and rotatable therein, said cylinder and valve having inlet and exhaust ports adapted to register alternately, a head for the cylinder having a tubular extension within the valve and means to prevent leakage between them, said head having an opening and said valve having an extension projecting through said opening and freely movable therein, and means on the outside of the head to impart movement to the valve comprising a rotating crank shaft having a crank pin spaced apart from and at an angle to the line of the shaft, a connecting rod mounted on the crank pin, and a ball-and-socket connection between the outer end of the rod and the extension of the valve.

KASIMIR W. NAJDER.